US008640163B2

(12) United States Patent
Weare et al.

(10) Patent No.: US 8,640,163 B2
(45) Date of Patent: Jan. 28, 2014

(54) DETERMINING USER-TO-USER SIMILARITIES IN AN ONLINE MEDIA ENVIRONMENT

(75) Inventors: Christopher Weare, Bellevue, WA (US); Chad Gibson, Seattle, WA (US); Jessica Zahn, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1156 days.

(21) Appl. No.: 12/242,601

(22) Filed: Sep. 30, 2008

(65) Prior Publication Data

US 2010/0083318 A1 Apr. 1, 2010

(51) Int. Cl.
*H04N 7/025* (2006.01)

(52) U.S. Cl.
USPC ......... 725/34; 725/97; 705/14.53; 705/14.55; 705/14.66

(58) Field of Classification Search
None
See application file for complete search history.

(56) References Cited

U.S. PATENT DOCUMENTS

| | | | | |
|---|---|---|---|---|
| 5,872,850 | A * | 2/1999 | Klein et al. | 705/51 |
| 6,112,186 | A | 8/2000 | Bergh et al. | |
| 6,832,242 | B2 | 12/2004 | Keskar | |
| 6,839,680 | B1 | 1/2005 | Liu et al. | |
| 6,922,699 | B2 * | 7/2005 | Schuetze et al. | 1/1 |
| 7,092,952 | B1 | 8/2006 | Wilens | |
| 2002/0178057 | A1 | 11/2002 | Bertram et al. | |
| 2004/0117357 | A1 | 6/2004 | Schirmer et al. | |
| 2004/0148347 | A1 | 7/2004 | Appelman et al. | |
| 2004/0172267 | A1 | 9/2004 | Patel et al. | |
| 2006/0195790 | A1 * | 8/2006 | Beaupre et al. | 715/727 |
| 2007/0038659 | A1 * | 2/2007 | Datar et al. | 707/101 |
| 2007/0282657 | A1 * | 12/2007 | Hupfer et al. | 705/9 |
| 2009/0024489 | A1 * | 1/2009 | Baldua et al. | 705/27 |

OTHER PUBLICATIONS

"Zune software v2.5 released—smart playlists return, gapless playback, and more . . . ", http://www.hardforum.com/showthread.php?p=1032477502 ; May 6, 2008.
"uPlayMe—Social Music Matching", http://mashable.com/2006/12/08/uplayme/.
Xiao, et al., "Clustering of Web Users Using Session-based Similarity Measures", Proceedings of 2001 International Conference on Computer Networks and Mobile Computing, 2001, pp. 223-228.
Middleton, et al., "Ontological User Profiling in Recommender Systems", ACM Transactions on Information Systems (TOIS), vol. 22 , Issue 1, Jan. 2004, 39 pages.
"Last.fm—the social music revolution", http://www.netsua.com/blog/lastfm ; Nov. 15, 2006.

* cited by examiner

*Primary Examiner* — Scott Beliveau
*Assistant Examiner* — Cynthia Fogg
(74) *Attorney, Agent, or Firm* — Alleman Hall McCoy Russell & Tuttle LLP

(57) ABSTRACT

The determination of similarities between users in an online entertainment environment is disclosed. For example, one disclosed embodiment comprises a method of operating an entertainment server, wherein the method includes receiving user information that comprises user demographic information and user media selection information from each user of a plurality of users. For a current user, a plurality of similarity values are determined that each quantifies a similarity of the current user to another user based upon similarities between the user information of the current user and the user information of the other user. Then, the method comprises determining a list of other users to present to the current user based upon the similarity values determined, and sending the list of other users to the current user.

20 Claims, 4 Drawing Sheets

Fig. 4

DETERMINING USER-TO-USER SIMILARITIES IN AN ONLINE MEDIA ENVIRONMENT

BACKGROUND

Online entertainment services may allow multiple users to purchase and/or download various types of media data, including but not limited to music, movies, television programs, etc. Further, a user of an online entertainment service may use the service to interact with other users on the service. For example, a user may wish to access lists of songs, artists, albums, movies, etc. compiled by another user with similar tastes or interests in order to discover previously unheard music or the like. However, locating users with similar tastes may be a time-consuming and labor-intensive process, and may involve visiting numerous other user profiles to search for users with similar media interests.

SUMMARY

Accordingly, various embodiments are disclosed herein that relate to the determination of similarities between users in an online entertainment environment. For example, one disclosed embodiment comprises a method of operating an entertainment server. The method includes receiving user information that comprises user demographic information and user media selection information from each user of a plurality of users. For a current user, a plurality of similarity values are determined that each quantifies a similarity of the current user to another user based upon similarities between the user information of the current user and the user information of the other user. Then, a list of other similar users to present to the current user is determined based upon the similarity values determined. Then, the list is sent to the current user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
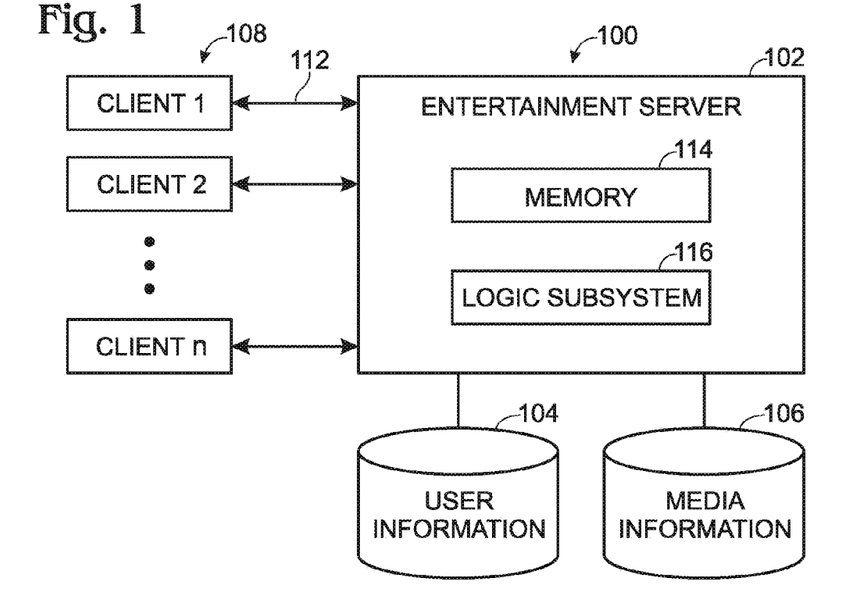
FIG. 1 shows a block diagram of an embodiment of a networked entertainment service environment.

FIG. 1 shows a block diagram of an example online media environment 100. Online media environment 100 comprises an entertainment server 102 in communication with a user information database 104 and a media information database 106.

The user information database 104 may store various data related to each user of a plurality of users of the entertainment server. Examples of such user information may include administrative information, such as logon information, billing information (for pay services), etc. Such user information also may include user demographic information, including but not limited to information regarding age, sex, location, etc. of users. The user information also may include media selection information, such as previous media selections made by a user, profiles of other users accessed by the user, various user-entered information such as favorite artists, titles, songs, movies, television shows, etc. of a user, user-generated content such as reviews, recommendations, ratings, etc., and/or any other suitable information related to the users of the entertainment server. It will be understood that such user-related information may be stored at the option of a user, and that a user may either opt into or opt out of the tracking of such information in various embodiments.

The media information database 106 may be configured to store media items accessible by users of the entertainment server 102. Such media items may include songs, albums, videos, movies, television shows, radio programs, podcasts, and/or any other suitable type of media items.

The entertainment server 102 is shown communicating with n clients 108. Each client 108 may communicate with the entertainment server 102 over a network link 112, or in any other suitable manner. Each client 108 represents a computing device operated by a user accessing the entertainment server 102. The entertainment server 102 further includes memory 114, which may comprise both volatile and non-volatile memory, and a logic subsystem 116 comprising one or more processors and/or other suitable logic components for executing programs. As such, the memory 108 may comprise instructions stored thereon that are executable by the logic subsystem 110 to perform the various tasks related to operating an online entertainment service. For example, the instructions may be executable to accept user registrations from new users, to manage user sessions, and to perform other such administrative tasks. Further, the instructions may be executable to interact with a client 108 to allow a user to browse for available media items, to select media items for playback or downloading, to compose and/or upload media playlists, to upload lists of favorite artists, titles, albums, selections, television shows, movies, podcasts, etc., to access playlists and/or list of favorites of other users, to interact with other users via chat rooms, blogs, etc.

The entertainment server 102 may further be configured to determine a similarity measure between a user and other users, to present a user with a list of zero or more similar users, and to send the list to a client 108 for display on a user interface of a current user. Further, the user interface on the client 108 may be configured to receive a selection of a selected similar user from the list, and to send the selection to the entertainment server 102, which may respond by providing further information on the selected similar user to the client 108 for display to the current user. In this manner, the current user of the entertainment server 102 may easily locate other users determined to be similar to the current user, and may then browse a profile of the selected similar user to learn about the selected similar user's media interests, favorite media items. The current user also may be able to interact directly with the selected similar user, for example, by clicking through to the selected similar user's profile or page on the entertainment server 102, selecting a media item listed on the selected similar user's page, leaving a comment on the selected similar user's page, sending an email message or instant message to the selected similar user, requesting the selected similar user to join a social network, etc.

A potential difficulty that may be encountered in determining a list of similar users to send to a current user may be in quantifying a similarity between users. One simple method of quantifying similarities between users may be to gather statistical information regarding the media selections made by users, and then determining a user-user similarity based upon similarities between media selections. However, such a method may not produce a reliable similarity measure for various reasons. For example, the fact that two users select a common media item for playback or downloading may have more or less value depending upon the relative popularity of the media item. Where the media item is extremely popular, a common interest in the item may be less informative of a similarity between two users than where the media item is less popular. Further, focusing a similarity determination solely upon media selections may ignore other information, such as user age, location, etc., that may be useful in quantifying a similarity between users.

Figure 2:
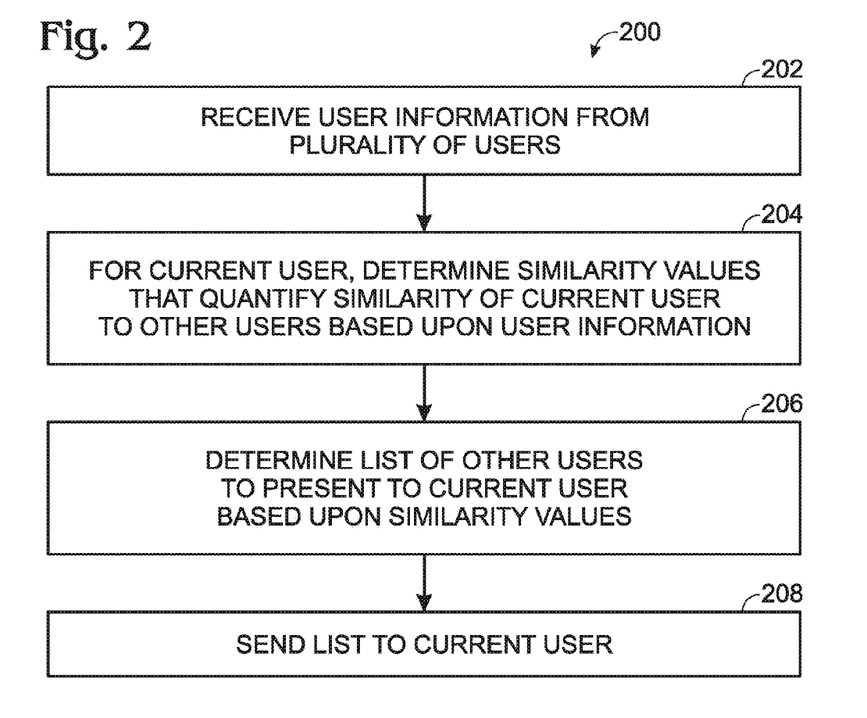
FIG. 2 shows a process flow depicting an embodiment of a method of operating an entertainment server.

Therefore, the entertainment server 102 may be configured to quantify a similarity between users based upon information in addition to, and/or other than, similarities between media selections. FIG. 2 shows an embodiment of a method 200 that may be used by the entertainment server 102 to present a list of similar users to a current user. Method 200 first comprises, at 202, receiving user information from a plurality of users. Such "user information" comprises both demographic information and media selection information. User demographic information may comprise information regarding a user's age, gender, geographic location, etc. Such user demographic information may be received, for example, during user registration, where a user may be asked to enter optional demographic information a part of a user registration process. In some embodiments, such information also may be entered at any time after registration, or may be changed, hidden, deleted, etc. at the user's option. User media selection information may comprise such information as media selections made by the user (e.g. song selections, artist selections, album selections, program selections, movie selections, etc.), media item preferences (e.g. genre, artist, title, song, movie, television show, etc. preferences), fan club memberships, mailing list memberships, social group memberships, user self-descriptions (e.g. "indie fan", "trance fan", etc.) entered by the user during registration or after registration, and/or any other information related to a user's media interests.

Next, at 204, a similarity value is determined that quantifies a similarity of the current user to another user based upon the user information of the current user and the user information of the other user. Such a similarity value may be determined in any suitable manner. For example, in one embodiment, for each user, a feature vector that represents the media selection information and user demographic information for the user is determined, and then the feature vectors for each user-user pair to be compared are used as inputs into a similarity value determination. In this manner, a pair of vector inputs are utilized to determine a numerical output.

In some embodiments, the various components of the feature vector each may be weighted in the similarity value determination based upon a value of the component to the similarity calculation. As an example, media selection information related to the selection of more poplar media items may be weighted less than media selection information related to the selection of less popular items. In these embodiments, appropriate weighting factors may be determined in any suitable manner that gives rise to an inverse relation between the weighting factor for a specific media item and a popularity of the media item. In one specific embodiment, an inverse of a log of the total play counts of a media item may be used as a weighting factor. It will be understood that this specific example is presented for the purpose of illustration, and is not intended to be limiting in any manner.

Any suitable similarity determination may be used to determine a similarity value between users (a "user-user similarity value"). In some embodiments, a cosine similarity determination may be utilized. One example implementation of a cosine similarity determination is as follows. For each desired user-user pair, the feature vectors for each user are input into the following equation:

$$S_{jk} = \frac{\sum_{i}^{N} \alpha_i^2 \log(C_{ij}+1)\log(C_{ik}+1) + \sum_{l}^{M} \beta_l^2 F(f_{lj}, f_{lk})}{\left(\sum_{i}^{N} \alpha_i \log(C_{ij}+1)^2 + \sum_{l}^{M} \beta_l f_{lj}\right)\left(\sum_{i}^{N} \alpha_i \log(C_{ik}+1)^2 + \sum_{l}^{M} \beta_l f_{lk}\right)},$$

where j and k are user identities, N is a number of unique media selection information parameters (e.g. number of songs, artists, genres, etc.), M is a number of user demographic parameters (e.g. age, location, gender, etc.), $\alpha_i$ is a weight of the ith play-based parameter, $\beta_l$ is a weight of the lth demographic-based parameter, $C_{ij}$ is a number of times that the ith item is played by the user, and, $$F(f_{lj}, f_{lk}) = \begin{cases} 0, & f_{lj} \neq f_{lk} \\ 1, & f_{lj} = f_{lk}. \end{cases}$$

It will be noted that $S_{kk}$ is equal to one. In other embodiments, one or more other similarity calculations, such as a Jaccard similarity, probabilistic determinations, etc. may alternatively or additionally be used. It will be appreciated that, depending upon the similarity determination employed, for two users A and B, the similarity of user A to user B may or may not equal the similarity of user B to user A.

Continuing with FIG. 2, method 200 next comprises, at 206, determining a list of zero or more users to present to the current user based upon the similarity values determined at 204. This may comprise sending a list of users determined to be most similar to the current user, and/or any other suitable list of users. The list may be determined upon receipt of a request for the list from a current user (for example, in response to a request such as "Find users similar to me," "Find users similar to another user," etc.), may be determined automatically for each user when a user logs on to a new use session, or may be determined in response to any other suitable trigger. Finally, method 200 comprises, at 208, sending the list of similar users to the current user for display on the current user's user interface. In some embodiments, the list may be ordered based upon the similarity values of other users such that the list is ordered by descending or ascending similarity values. In other embodiments, the list may be ordered in any other suitable manner.

Figure 3A:
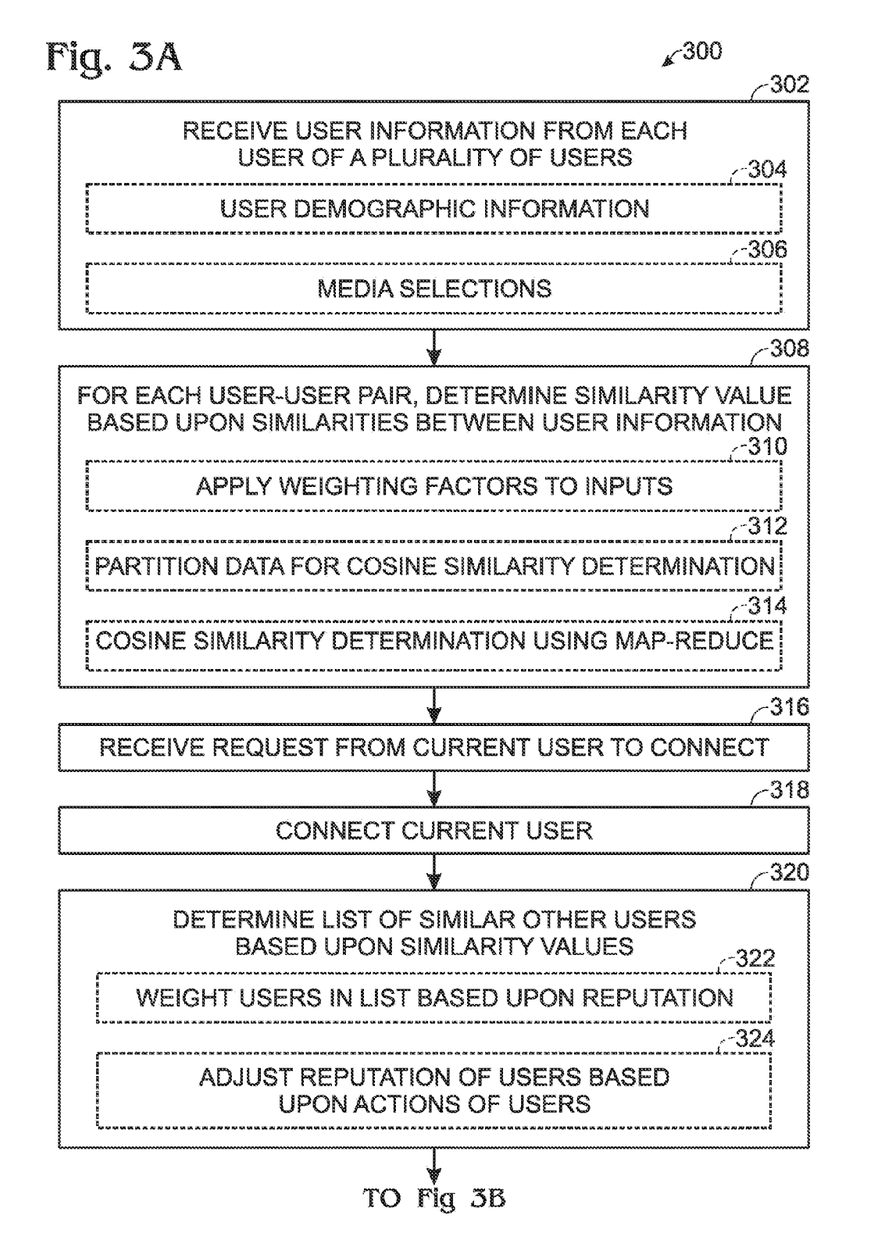
FIGS. 3A and 3B show a process flow depicting another embodiment of a method of operating an entertainment server.
Figure 3B:
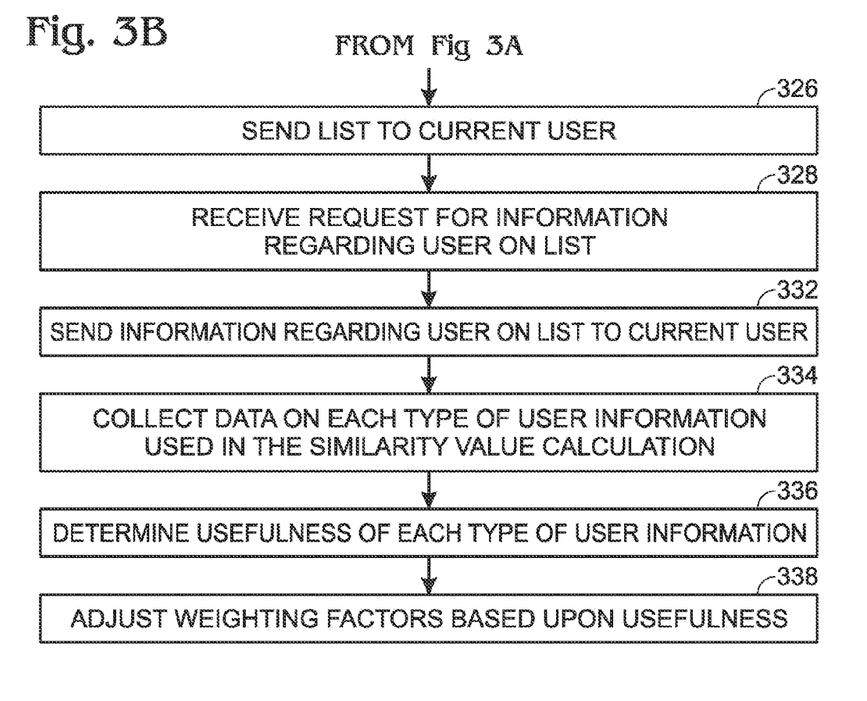

Method 200 may be implemented in any suitable manner. FIG. 3 shows an embodiment of a method 300 that illustrates a more detailed implementation of method 200 for an entertainment server with an extremely large number of users. Method 300 also provides for the automatic updating and adjustment of the user-user similarity determination based upon past user behavior, and therein allows the similarity determination to undergo automatic optimization over time.

Method 300 first comprises, at 302, receiving user information from each of a plurality of users, wherein the user information may comprise user demographic information 304 and user media selection information 306. Next, method 300 comprises, at 308, determining for each user-user pair a similarity value based upon similarities between the user information of each user. The similarity value may be determined in any suitable manner. For example, as indicated at 310, one or more weighting factors may be applied to each input item of user information to adjust for differences in the value of each item of user information toward the similarity value determination. Further, as mentioned above, such weighting factors may be adjusted over time to update the similarity value determination. In one specific embodiment, each item of user information in the similarity calculation is equally weighted upon initialization. The weights are then adjusted over time as more user statistics are aggregated to weigh factors more heavily that result in a successful match of similar users as judged, for example, on whether a current user selects a similar user from a list of similar users.

As mentioned above, any suitable similarity calculation may be used to determine the similarity value. For example, a cosine similarity determination such as that described above may be used in some embodiments. In this case, as shown at 312, method 300 may comprise partitioning the data for a cosine similarity determination. In other embodiments, another similarity calculation, such as a Jaccard similarity determination or a probabilistic determination, may be used.

In some embodiments, an entertainment server may have large numbers of users, for example, over a million users. Calculating user-to-user similarity values for each pair of users therefore may be a computationally-intensive process. Therefore, in order to allow for such large numbers of calculations, as well as to facilitate the introduction of new users, new types of user information, etc. to the user similarity determination process, a map-reduce calculation 314 may be used in the similarity value calculation process to make the calculation scalable potentially to millions of users. Using a map-reduce version of the cosine similarity enables the calculation to be spread over several machines for efficient processing.

Continuing with FIG. 3, method 300 next comprises, at 316, receiving a request from a current user to connect to the server, and then at 318, connecting the user to the server. Then, at 320, method 300 comprises determining a list of other similar users based upon the user-to-user similarity values for user-user pairs that include the current user. In some embodiments, the similarity values produced from the similarity value calculation are used directly for this determination. In other embodiments, as indicated at 322, a "reputation" of a user on the list may be used to further weight the calculated similarity value. Such weighting alternatively may be applied in the similarity value calculation as an adjustment to the individual weighting factors used in the calculation.

The term "reputation" is used herein to describe any factor that may be used to provide positive or negative weight to a user and that is based upon activities of a user on an entertainment server. For example, activities such as recommending media items, reviewing media items, leaving comments in a chat room or a forum, etc. may be considered positive interactions that increase a reputation of a user.

In some embodiments, as indicated at 324, each user may be assigned the same initial reputation value, which then may be adjusted upward or downward as events that positively impact a user's reputation occur. In one specific embodiment, the user reputation value has a possible range of between 0 and 1. In this example, each user may initially have a reputation value of 0.3-0.5. This value may be increased, for example, when the user performs one of the above-listed actions (or other actions determined to positively impact reputation). Likewise, this value may be decreased, for example, if a user is inactive for a long period of time, or if the user performs events that are determined to impact the user's reputation negatively.

Continuing with FIG. 3, once the list has been determined, method 300 comprises, at 326, sending the list to the user. Next, a request for further information on a selected similar user is received from the user at 328, and is sent to the user at 332.

In some embodiments, as indicated at 332, data regarding each type of user information used in the similarity calculation is collected as requests stemming from the lists of similar users are received. Collecting this data may comprise, for example, determining which factors in a similarity determination were primary in including a selected similar user (i.e. a user on the similar users list that receives a click-through) on a list of similar users. This may allow a usefulness of each type of user information to be determined, as indicated at 336. This also may allow weighting factors used for each item of user information in the similarity value calculation to be adjusted, as indicated at 338. For example, where one or more factors are determined to have been primary in the decision to include a selected similar user on the list of similar users, then those factors are determined to be useful, and the weighting of those factors is increased for future similarity value determinations. A magnitude of the adjustment made to the weighting factors may vary depending upon the nature of the request for similar user information that is received from the current user. For example, a smaller increase in the weighting of a factor may occur if the current user merely clicks through to the other similar user's page, while a larger increase to the weighting may occur if the current user leaves a message or a friend request for the similar user, or clicks through to a song listed on the similar user's page.

Likewise, where the current user elects to block a user on the similar user list from appearing on the list again, a weighting of the primary factors that lead to the blocked user being included on the list of similar users may be decreased for future similarity calculations. Additionally, if a current user declines to take any action on any users in a list of similar users, then the weightings may be left the same.

In some embodiments, collecting data on the types of user information used in the similarity calculation may comprise actively seeking such information from users. For example, a current user may be presented with a user interface that allows the current user to explicitly state that a similar user recommendation (i.e. the inclusion of the similar user on the list of similar users) was valuable. For example, in one specific embodiment, the current user may be asked via the user interface "Is this user similar to you?" If the current user answers "yes", then the primary items that caused the similar user to be included on the current user's list of similar users may be given greater weight in future similarity value determinations. Likewise, if the user answers "no", the primary items that lead to the inclusion of the other user on the list of similar users may be offered less weight in future similarity value calculations. In yet other embodiments, the weighting of an item of user information may be increased based upon the similarity of the item to other items of user information that have been determined to be useful in the similarity value calculation. It will be understood that the specific examples of adjustments of the weightings applied to user information items in a similarity value calculation are described for the purpose of example, and that any other suitable adjustments may be used without departing from the scope of the present disclosure.

Figure 4:
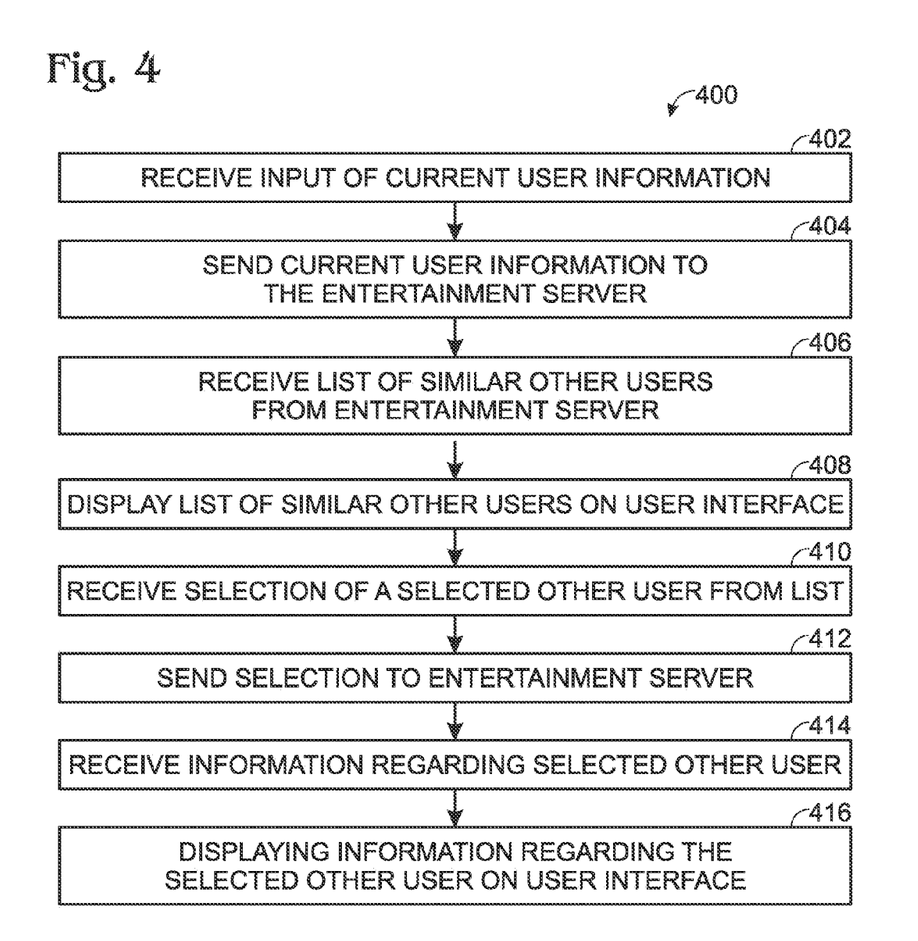
FIG. 4 shows an embodiment of a method of interacting with an entertainment server.

FIG. 4 shows an embodiment of a method 400 of interacting with an entertainment server. Method 300 may be performed, for example, by a client computing device 108 interacting with the entertainment server 102 in the network media environment of FIG. 1. Method 400 comprises, at 402, receiving an input of user information from a current user. Such information, which may be referred to herein as "current user information", may include user demographic information (for example, information input during registration or user profile updating) and/or user media selection information (for example, media item playback or download requests, playlist composition requests, etc.). Next, method 200 comprises sending the current user information to an entertainment server, at 404, and then receiving a list of similar other users from the entertainment server, at 406. Then, at 408, the list of similar other users is displayed on a user interface, at 410. The list may be displayed in an order based upon similarity values (i.e. the determined most similar other user is displayed first in the list), in alphabetical order, or in any other suitable order.

Next, method 400 comprises receiving a selection of a selected other user from the list, at 410. Such a selection may comprise, for example, a click-through to a profile, web page, etc. of the other user, a request to play or download a media item listed on the selected other user's page or profile, an email message or instant message to the selected other user, a comment for display on the other user's page, etc. Upon receipt of the selection, the selection is sent to the entertainment server, at 412. Then, the requested information about the selected other user is received, at 414, and then displayed to the current user on a user interface, at 416. Further, in some embodiments, displaying information about the other user on the user interface may comprise requesting input from the current user regarding whether the selected other user is similar. The current user's answer to this question may then be received (not shown) and sent to the entertainment server for analytical purposes.

It will be appreciated that the entertainment server and client computing devices described herein each may be any suitable computing device(s) configured to execute the programs described herein. For example, the computing devices may be a mainframe computer, personal computer, laptop computer, portable data assistant (PDA), computer-enabled wireless telephone, portable media player, and/or any other suitable computing device, and/or combinations thereof. As mentioned above, such computing devices are configured to execute programs stored in non-volatile memory using portions of volatile memory and a processor and/or other logic subsystem components. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It will further be understood that the embodiments described herein are exemplary in nature, and that these specific embodiments or examples are not to be considered in a limiting sense, because numerous variations are contemplated. Accordingly, the present disclosure includes all novel and non-obvious combinations and sub-combinations of the various embodiments disclosed herein, as well as any and all equivalents thereof.

The invention claimed is:

1. A method of operating an entertainment server computing device, the method comprising:

receiving at the computing device via a computer network input items of user information comprising user demographic information and user media selection information from each user of a plurality of users;

for a current user, determining on the computing device a plurality of similarity values that each quantifies a similarity of the current user to another user based upon similarities between the input items of user information of the current user and the input items of user information of the other user, where each similarity value is based on one or more weighting factors applied to the input items of user information for each of the current user and the other user;

determining on the computing device a list of zero or more other users to present to the current user based upon the similarity values determined;

sending the list of zero or more other users to the current user via the computer network;

receiving from the current user via the computer network a request for interaction regarding a user on the list; and modifying a weighting factor applied to one or more input items of user information for use in future similarity value determinations on the computing device by increasing the weighting factor a first amount if the request for interaction comprises a request to view a page of the user; and increasing the weighting factor a second amount greater than the first amount if the request for interaction comprises one or more of communicating with the user and a request for media content associated with the user.

2. The method of claim 1, further comprising determining a similarity value for each user-user pair of the plurality of users.

3. The method of claim 1, wherein determining a list comprises ordering the list based upon similarity values of the other users.

4. The method of claim 3, wherein determining a list further comprises weighting the similarity value of each user in the list based upon a calculated reputation of each user in the list.

5. The method of claim 4, further comprising adjusting the calculated reputation of each user on the list based upon actions performed by the user.

6. The method of claim 1, wherein the request for interaction regarding the user on the list comprises a request for information regarding the user.

7. The method of claim 1, wherein the request for interaction regarding the user on the list comprises a request to block the user.

8. The method of claim 1, wherein communicating with the user comprises one or more of a request to send a message to the user and a request to friend the user, and wherein a request for media content associated with the user comprises a request to play a song on the page of the user.

9. The method of claim 1, wherein determining a plurality of similarity values comprises determining the plurality of similarity values via a cosine similarity calculation.

10. The method of claim 9, wherein each similarity value is determined on the computing device according to the relationship:

$$S_{jk} = \frac{\sum_{i}^{N} \alpha_i^2 \log(C_{ij}+1)\log(C_{ik}+1) + \sum_{l}^{M} \beta_l^2 F(f_{lj}, f_{lk})}{\left(\sum_{i}^{N} \alpha_i \log(C_{ij}+1)^2 + \sum_{l}^{M} \beta_l f_{lj}\right)\left(\sum_{i}^{N} \alpha_i \log(C_{ik}+1)^2 + \sum_{l}^{M} \beta_l f_{lk}\right)},$$

where j and k are user identities, N is a number of unique media selection information parameters, M is a number of user demographic parameters, $\alpha_i$ is a weight of the ith play-based parameter, $\beta_l$ is a weight of the lth demographic-based parameter, $C_{ij}$ is a number of times that the ith item is played by the user, and $$F(f_{lj}, f_{lk}) = \begin{cases} 0, & f_{lj} \neq f_{lk} \\ 1, & f_{lj} = f_{lk}. \end{cases}$$

11. The method of claim 1, wherein determining a plurality of similarity values comprises determining the plurality of similarity values via a map-reduce calculation.

12. A method of interacting with an entertainment server, comprising:
receiving an input of current user demographic information from a current user;
receiving an input of current user media selection information from the current user;
sending the current user demographic information and the current user media selection information to the entertainment server;
receiving a list of similar other users from the entertainment server, where the list of similar other users is based on a plurality of similarity values that each quantifies a similarity of the current user to another user based upon one or more weighting factors applied to input current user demographic information and input current user media selection information received from the current user and the other user;
displaying the list of similar other users on a user interface;
receiving a selection of a selected other user from the list of similar users;
modifying a weighting factor applied to one or more of the input current user demographic information and/or the input current user media selection information in a similarity value determinations by
increasing the weighting factor by a first amount if the selection of the selected other user comprises a request to view a page of the user; and
increasing the weighting factor by a second amount greater than the first amount if the selection of the selected other user comprises one or more of communicating with the other user and a request for media content associated with the user;
sending the selection of the selected other user from the list of similar users to the entertainment server; and
if the selection of the selected other user comprises a request for information regarding the selected other user,
receiving information about the selected other user from the entertainment server, and
displaying the information about the selected other user on the user interface.

13. The method of claim 12, further comprising receiving from the current user an input requesting transmission of a media item selection from the information about the selected other user, sending a request for the media item selection to the entertainment server, and receiving the media item selection from the entertainment server.

14. The method of claim 12, wherein the current user demographic information comprises one or more of age, gender and location.

15. The method of claim 12, wherein the current user media selection information comprises one or more of media selections made by the current user, media item preferences, fan club memberships, mailing list memberships, social group memberships, and user self-descriptions.

16. An entertainment server, comprising:
a logic subsystem; and
memory comprising instructions executable by the logic subsystem to perform a method comprising:
receiving input items of user information from each user of a plurality of users;
for each user-user pair of the plurality of users, determining a similarity value that quantifies a similarity of the user-user pair based upon similarities between the input items of user information of each user of the user-user pair, where the similarity value is based on one or more weighting factors applied to each input item of user information of each user of the user-user pair;
receiving a request from a current user to connect to the entertainment server;
connecting the current user to the entertainment server;
determining a list of zero or more other users to present to the current user based upon the similarity values of user-user pairs that include the current user;
sending the current user the list of zero or more other users;
receiving from the current user a request for interaction regarding a user on the list; and
modifying a weighting factor applied to one or more input items of user information in a similarity value determination by
increasing the weighting factor a first amount if the request for interaction comprises a request to view a page of the user; and
increasing the weighting factor a second amount greater than the first amount if the request for interaction comprises one or more of a request to send a message to the user, a request to friend the user, and a request to play a song on the page of the user.

17. The entertainment server of claim 16, wherein the instructions are executable to determine the list by weighting each user in the list based upon a calculated reputation of each user in the list.

18. The entertainment server of claim 17, wherein the instructions are further executable to adjust the calculated reputation of each user on the list based upon actions of each user on the list.

19. The entertainment server of claim 16, wherein the weighting factor is selected from a plurality of weighting factors, and wherein the instructions are executable to determine a similarity value for each user-user pair by:
applying one or more of the plurality of weighting factors to types of user information used as inputs in the similarity value determination;
collecting information on each type of user information used in the similarity value determination;
determining a usefulness of each type of user information used in the similarity value determination;

and adjusting the weighting factor of each type of user information used in the similarity determination based upon the usefulness.

20. The entertainment server of claim 16, wherein the request for interaction regarding the user on the list comprises one or more of a request for information regarding the user and a request to block the user.

\* \* \* \* \*